(12) United States Patent
Nakashima et al.

(10) Patent No.: US 9,928,045 B2
(45) Date of Patent: Mar. 27, 2018

(54) INFORMATION PROCESSING APPARATUS, COMPILE METHOD AND NON-TRANSITORY RECORDING MEDIUM STORING COMPILE PROGRAM

(71) Applicant: FUJITSU LIMITED, Kawasaki-shi, Kanagawa (JP)

(72) Inventors: Kohta Nakashima, Kawasaki (JP); Yuto Tamura, Kawasaki (JP); Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/207,552

(22) Filed: Jul. 12, 2016

(65) Prior Publication Data

US 2017/0060548 A1   Mar. 2, 2017

(30) Foreign Application Priority Data

Aug. 24, 2015 (JP) ................. 2015-165000

(51) Int. Cl.
*G06F 9/45* (2006.01)
*G06F 9/30* (2018.01)

(52) U.S. Cl.
CPC ............. *G06F 8/41* (2013.01); *G06F 8/443* (2013.01); *G06F 8/447* (2013.01); *G06F 8/52* (2013.01); *G06F 9/30058* (2013.01)

(58) Field of Classification Search
CPC ......... G06F 8/52; G06F 9/45516; G06F 8/443
USPC ........................................ 717/146, 148, 158
See application file for complete search history.

(56) References Cited

U.S. PATENT DOCUMENTS

| | | | |
|---|---|---|---|
| 5,784,605 A | 7/1998 | Ando | |
| 8,341,609 B2 * | 12/2012 | Lee | G06F 8/4434 711/202 |
| 2004/0049667 A1 * | 3/2004 | McCormick, Jr. | G06F 9/322 712/233 |
| 2004/0111719 A1 * | 6/2004 | Civlin | G06F 8/60 717/159 |
| 2011/0320785 A1 * | 12/2011 | Chen | G06F 9/3806 712/233 |
| 2014/0165049 A1 * | 6/2014 | Diamos | G06F 8/443 717/156 |
| 2014/0289716 A1 * | 9/2014 | Adl-Tabatabai | G06F 8/4441 717/146 |
| 2015/0128144 A1 * | 5/2015 | Mansell | G06F 9/50 718/104 |

FOREIGN PATENT DOCUMENTS

| | | |
|---|---|---|
| JP | 07-044372 | 2/1995 |
| JP | 08-227363 | 9/1996 |

* cited by examiner

*Primary Examiner* — Phillip H Nguyen
(74) *Attorney, Agent, or Firm* — Fujitsu Patent Center

(57) ABSTRACT

An information processing apparatus includes: a memory configured to store a first code; and a processor configured to compile a source file to generate the first code, wherein the processor: generates a second code, which is executable by the processor, based on a result of analysis of the source program; and divides the second code into blocks of a size equal to or smaller than a given size including a reservation region to generate the first code.

15 Claims, 10 Drawing Sheets

US 9,928,045 B2

INFORMATION PROCESSING APPARATUS, COMPILE METHOD AND NON-TRANSITORY RECORDING MEDIUM STORING COMPILE PROGRAM

CROSS-REFERENCE TO RELATED APPLICATION

This application is based upon and claims the benefit of priority of the prior Japanese Patent Application No. 2015-165000, filed on Aug. 24, 2015, the entire contents of which are incorporated herein by reference.

FIELD

The embodiment relates to an information processing apparatus, a compile method and a non-transitory recording medium storing a compile program is recorded.

BACKGROUND

A central processing unit (CPU) includes a branch instruction.

A related art is disclosed in Japanese Laid-open Patent Publication No. 08-227363 or Japanese Laid-open Patent Publication No. 07-44372.

SUMMARY

According to an aspect of the embodiment, an information processing apparatus includes: a memory configured to store a first code; and a processor configured to compile a source file to generate the first code, wherein the processor: generates a second code, which is executable by the processor, based on a result of analysis of the source program; and divides the second code into blocks of a size equal to or smaller than a given size including a reservation region to generate the first code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A branch instruction includes two kinds of instructions: a relative short branch instruction and a relative branch instruction. The relative short branch instruction is an instruction for branching from an address in which the relative short branch instruction is placed to another address within a range, for example, of −128 to +127 bytes (B), and is configured from totaling 2 B including an instruction code of 1 B and a relative address of 1 B. Therefore, the relative short branch instruction has a short instruction length.

The relative branch instruction is an instruction for branching from an address in which the relative branch instruction is placed to another address within a range that exceeds the range from −128 to +127 B and is configured from totaling 5 B including an instruction code of 1 B and a relative address of, for example, 4 B. Consequently, the relative branch instruction has a long instruction length. Therefore, within the range of an address that can be reached by the relative short branch instruction, a compiler outputs a relative short branch instruction as a branch instruction.

When the relative address of the branch destination of a branch instruction is outside the branching range, branching to an address outside the branching range is performed, for example, by generating a long branch instruction in a free space and changing the original branch destination of the branch instruction to the address of the long branch instruction.

Where the size of a branch instruction to a patch area is greater than a modify area, a destruction area is searched for immediately before or immediately after the modify area for example, a branch instruction is inserted into the modify area and the destruction area, and a destructed instruction is included into the patch area to perform branching to the patch area.

When operation of loaded software during operation is modified with a patch, since branching from a patch target region to the patch area in which a modify code is placed is not within a range that is not reachable by the relative short branch instruction, the relative branch instruction is used for branching to the patch area. However, when the word length of the patch target region is shorter than the word length of the relative branch instruction, the relative branch instruction may not be inserted into the patch target region.

Figure 1:
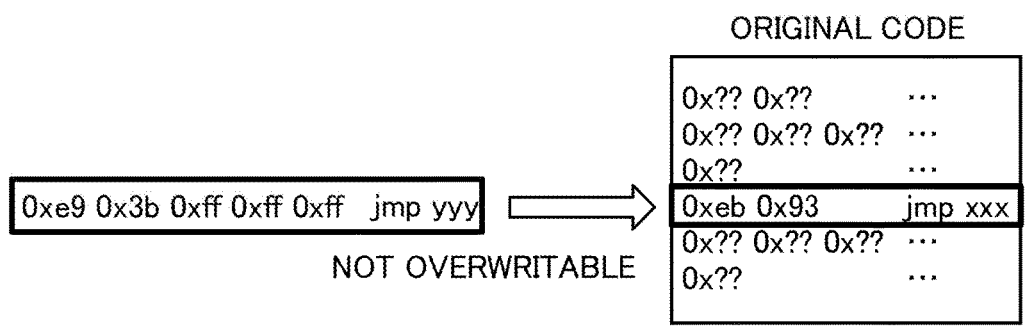
FIG. 1 illustrates an example of patching to a relative short branch instruction.

FIG. 1 illustrates an example of patching to a relative short branch instruction. In FIG. 1, a relative short branch instruction (jmp xxx) of 2 B for jumping to xxx is replaced by a relative branch instruction (jmp yyy) of 5 B for branching to yyy. jmp represents a branch instruction.

Referring to FIG. 1, 0x represents a hexadecimal number, and the instruction code of a relative short branch instruction is 0xeb while the instruction code of a relative branch instruction is 0xe9. 0x93 is an offset of the relative short branch instruction, and 0x3b 0xff 0xff 0xff is an offset of the relative branch instruction. ? is a numeral that is one of 0 to f.

As depicted in FIG. 1, if a relative short branch instruction of 2 B for jumping to xxx is replaced by a relative branch instruction of 5 B for branching to yyy for patching, 3 B following the relative short branch instruction may be overwritten. If 3 B following the relative short branch instruction are overwritten, if bytes following the relative short branch instruction include an instruction for jumping, the program may not be executed correctly.

Figure 2:
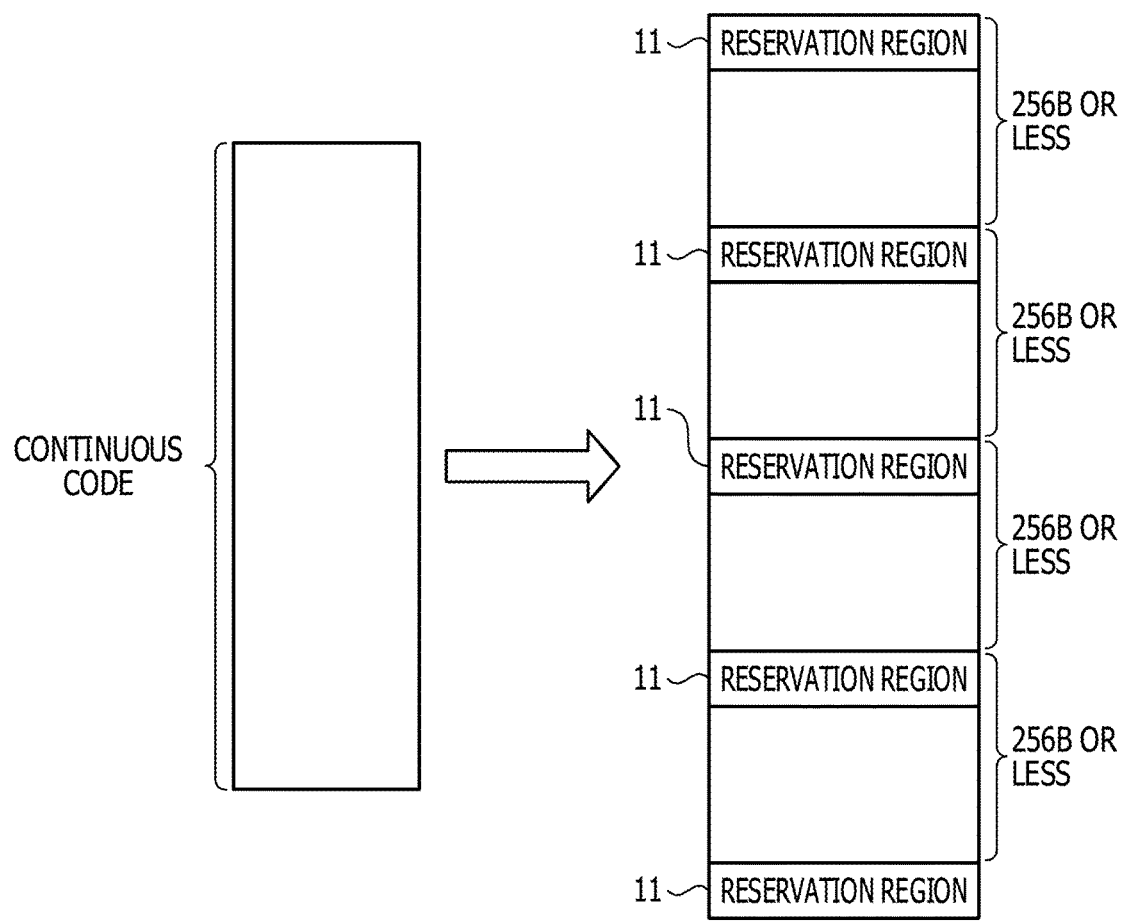
FIG. 2 illustrates an example of divisional generation of a code.
Figure 3:
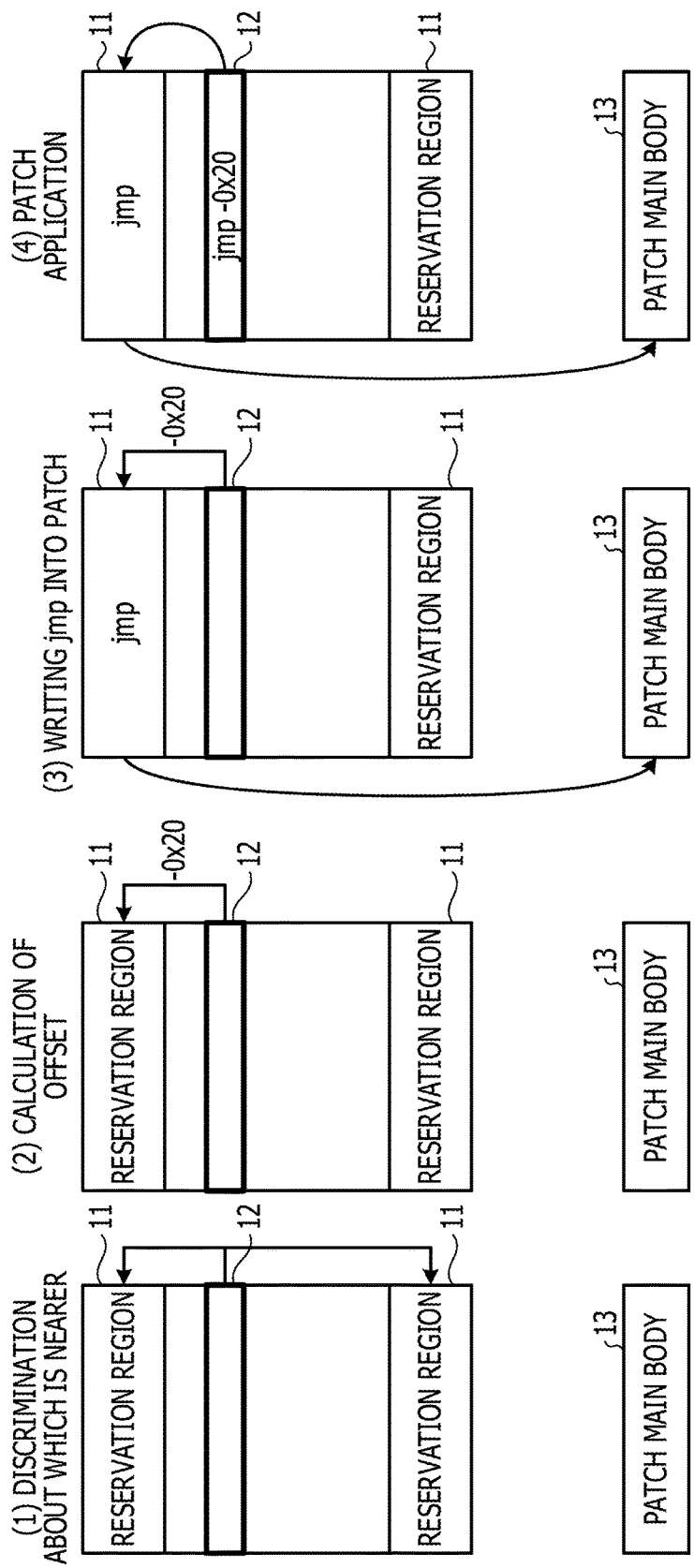
FIG. 3 illustrates an example of patch application.

FIG. 2 illustrates an example of divisional generation of a code. FIG. 3 illustrates an example of patch application.

As depicted in FIG. 2, in compile, a continuous code is divided into and outputted as blocks of 256 B or less each including a reservation region 11. In a patch being executed of a code including a reservation region 11, it is decided to the top address of which one of preceding and succeeding reservation regions 11 a patch target region 12 is nearer as depicted in FIG. 3 (1).

An offset between the top address of the nearer reservation region 11 and the top address of the patch target region 12 is calculated (2). In FIG. 3, the reservation region 11 preceding to the patch target region 12 is decided to be nearer to the patch target region 12, and −0x20 is the calculated offset. Into the nearer reservation region 11, a relative branch instruction for branching to a patch main body 13 is written (3).

A relative short branch instruction to the reservation region 11 is written into the patch target region 12 using the calculated offset (4). In this manner, in the patch application, intervention of the reservation region 11 makes it possible to branch to the patch main body 13 also when the word length of the patch target region 12 is shorter than the word length of the relative branch instruction.

When the patch target region 12 is a relative short branch instruction, since writing only of an offset is demanded, patch application is performed atomically. That patch application is performed atomically indicates that, upon patch application, a state in which failure in matching occurs does not appear. Where writing of 2 B or more is performed, there is the possibility that the 2 B or more may extend across the border between write units into the memory. If writing into the memory is divisionally performed twice, a state in which failure in matching occurs may appear after writing for the first time is performed until writing for the second time is performed.

Figure 4:
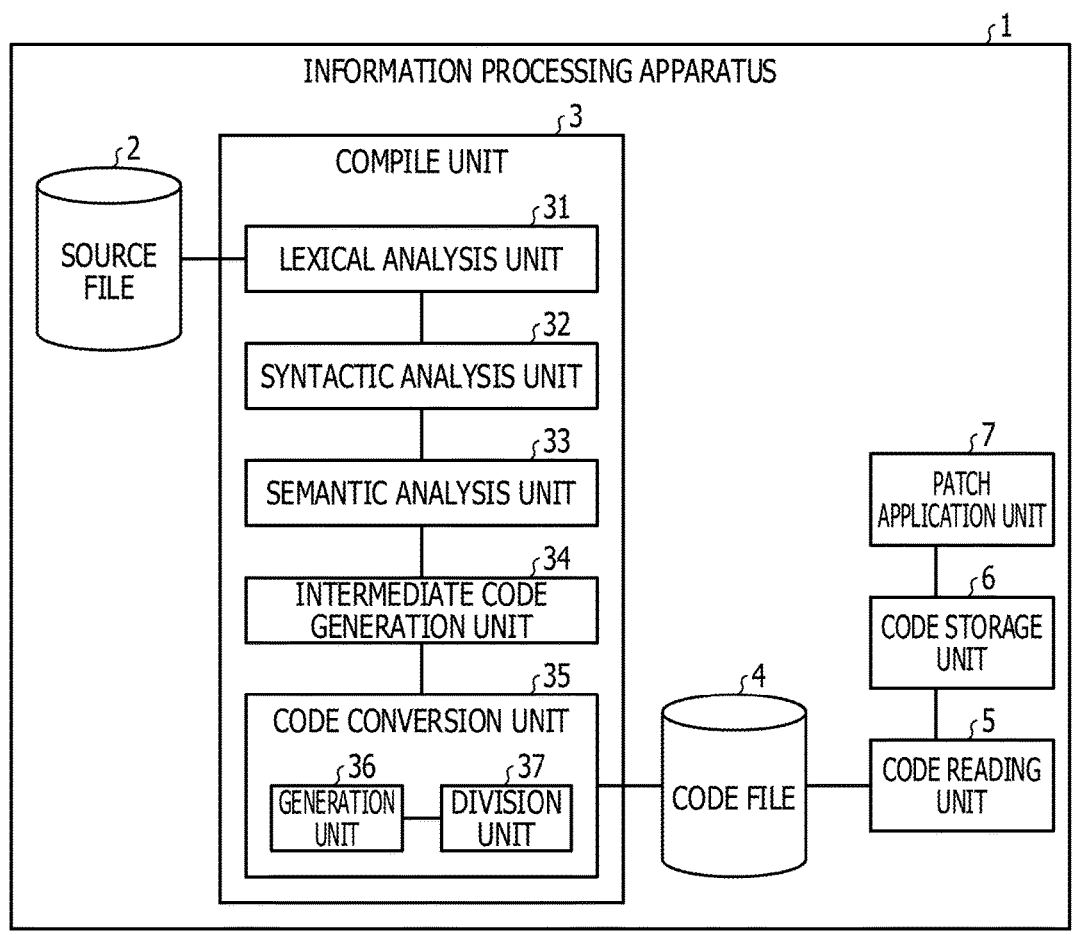
FIG. 4 depicts an example of a configuration of an information processing apparatus.

FIG. 4 depicts an example of a configuration of an information processing apparatus. As depicted in FIG. 4, an information processing apparatus 1 includes a source file 2, a compile unit 3, a code file 4, a code reading unit 5, a code storage unit 6 and a patch application unit 7.

The source file 2 is a file for storing a source program. The compile unit 3 reads in the source program from the source file 2 and generates a code to be executed by a CPU. The compile unit 3 includes a lexical analysis unit 31, a syntactic analysis unit 32, a semantic analysis unit 33, an intermediate code generation unit 34 and a code conversion unit 35.

The lexical analysis unit 31 performs lexical analysis of a source program. The syntactic analysis unit 32 receives a result of the lexical analysis as an input thereto and performs syntactic analysis. The semantic analysis unit 33 performs semantic analysis for a result of the syntactic analysis. The intermediate code generation unit 34 generates an intermediate code based on a result of the semantic analysis. The code conversion unit 35 converts the intermediate code into a code to be executed by the CPU.

The code conversion unit 35 includes a generation unit 36 and a division unit 37. The generation unit 36 generates a code to be executed by the CPU from the intermediate code. The division unit 37 divides the code generated by the generation unit 36 into blocks and inserts a reservation region 11 into each of the divided blocks. The division unit 37 divides the code into blocks of 256 B or less including the reservation region 11 and writes the codes in which the reservation regions 11 are inserted into the code file 4.

The code file 4 is a file for storing codes in which reservation regions 11 are inserted. The code reading unit 5 reads a code from the code file 4 into the code storage unit 6 in order to execute the code. The code storage unit 6 is a region of the memory and stores the codes read in from the code file 4 by the code reading unit 5.

The patch application unit 7 applies a patch to a code during operation stored in the code storage unit 6. For example, the patch application unit 7 writes a patch main body 13 into an unused region of the code storage unit 6. The patch application unit 7 decides to the top address of which one of preceding and succeeding reservation regions 11 the patch target region 12 is nearer, and calculates the difference between the top address of the nearer reservation region 11 and the top address of the patch target region 12 as an offset.

The patch application unit 7 writes a relative branch instruction to the patch main body 13 into the nearer reservation region 11 from the top. The patch application unit 7 writes the relative short branch instruction into the reservation region 11 nearer to the patch target region 12 using the calculated offset. Where a relative short branch instruction is stored in the patch target region 12, the patch application unit 7 writes only the calculated offset.

Figure 5:
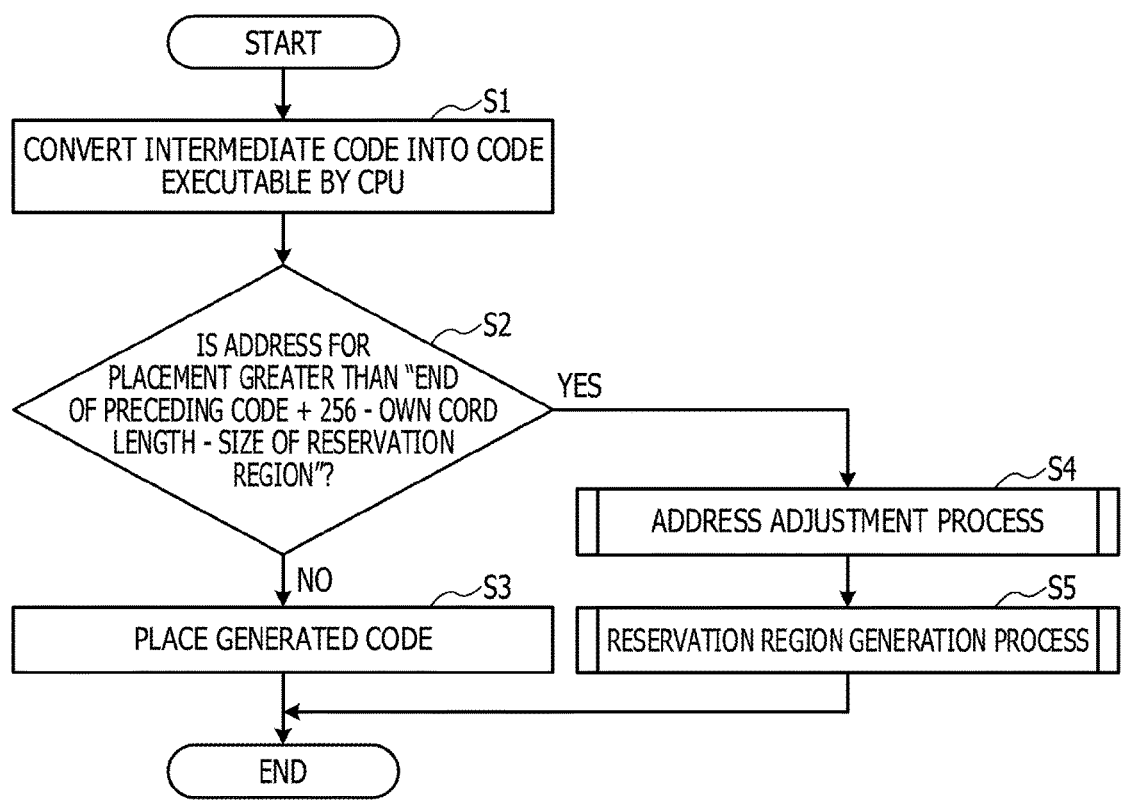
FIG. 5 illustrates an example of processing of a code conversion unit.

FIG. 5 illustrates an example of processing of a code conversion unit. The code conversion unit described with reference to FIG. 5 may be the code conversion unit 35 illustrated in FIG. 4. As illustrated in FIG. 5, the code conversion unit 35 converts an intermediate code into a code that can be executed by the CPU (operation S1).

The code conversion unit 35 decides, in order to place a code so as to be configured from blocks of 256 B or less, whether or not the address for the placement of the code is greater than the magnitude of the "end of preceding code by block division+256−own code length−size of reservation region 11" (operation S2). As a result, if the address for the placement is not greater, since the code can be placed into the block at present, the code conversion unit 35 places the generated code into the block at present (operation S3).

If the address for the placement is greater, the code conversion unit 35 performs an address adjustment process for converting the relative short branch instruction of the branch destination address that is not reachable with the relative short branch instruction into a relative branch instruction (operation S4). The code conversion unit 35 performs a reservation region generation process for generating a reservation region 11 into the block (operation S5).

Figure 6:
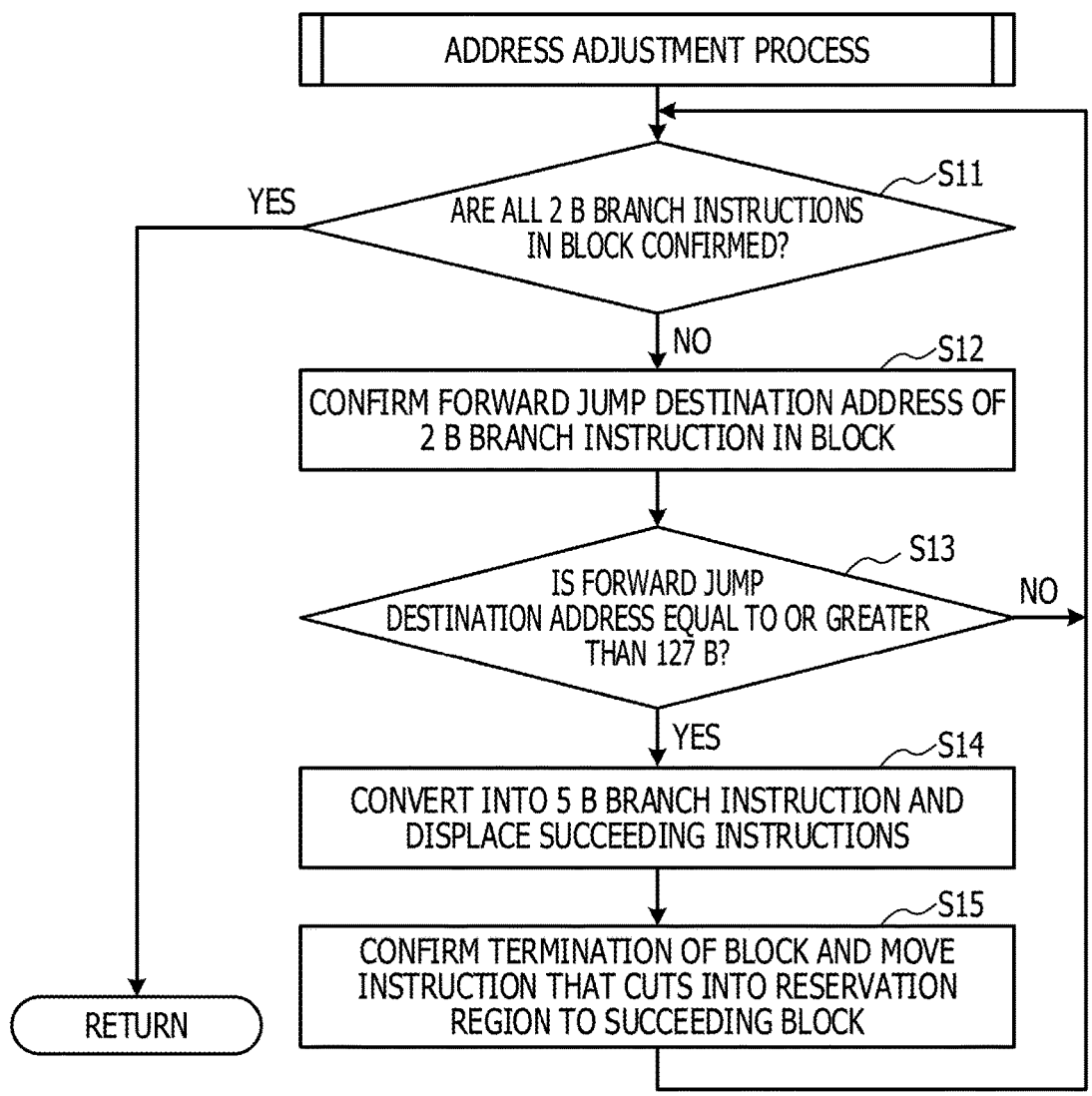
FIG. 6 illustrates an example of an address adjustment process.

FIG. 6 illustrates an example of the address adjustment process. As depicted in FIG. 6, the code conversion unit 35 decides whether or not all 2 B branch instructions in the block are confirmed (operation S11). If all 2 B branch instructions are confirmed, the processing is ended. The 2 B branch instruction may be a relative short branch instruction.

If the block includes a 2 B branch instruction that is not confirmed as yet, the code conversion unit 35 confirms a forward jump destination address of the 2 B branch instruction in the block (operation S12) and decides whether or not the forward jump destination address is equal to or greater than 127 B (operation S13). As a result, if the forward jump destination address is not equal to or greater than 127 B, the processing returns to operation S11.

On the other hand, if the forward jump destination address is equal to or greater than 127 B, the code conversion unit 35 converts the 2 B branch instruction into a 5 B branch instruction to displace succeeding instructions (operation S14). The 5 B branch instruction may be a relative branch instruction. The code conversion unit 35 confirms the termination of the block and moves an instruction that cuts into the reservation region 11 to a succeeding block (operation S15). The processing returns to operation S11.

Figure 7:
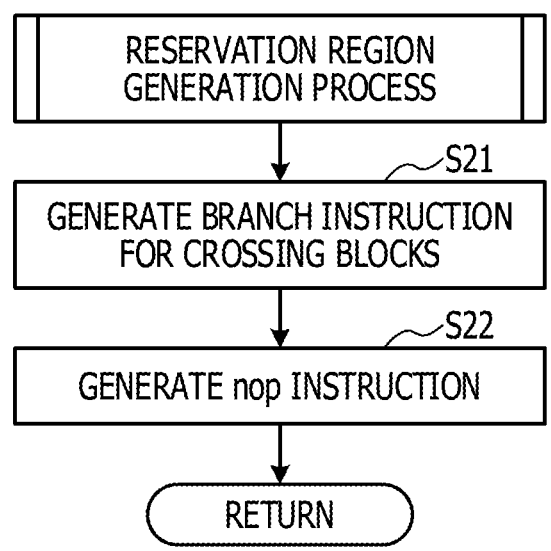
FIG. 7 illustrates an example of a reservation region generation process.

FIG. 7 illustrates an example of the reservation region generation process. As depicted in FIG. 7, the code conversion unit 35 generates a branch instruction for crossing blocks (operation S21). The code conversion unit 35 generates a nop instruction for the reservation region 11 (operation S22). The nop instruction may be an instruction for executing nothing.

Since the code conversion unit 35 generates a code divided into blocks of a size of equal to or smaller than 256 B including a reservation region 11 in this manner, the patch application unit 7 inserts a branch instruction to the patch main body 13 by a relative branch instruction into a code also where the size of the patch target region 12 is 2 B.

As described above, the generation unit 36 generates a code that can be executed by the CPU from an intermediate code generated by the intermediate code generation unit 34. The division unit 37 divides the code generated by the generation unit 36 into blocks and inserts a reservation region 11 into each of the divided blocks. The division unit 37 divides the code into blocks of equal to or smaller than 256 B including a reservation region 11 and writes the codes in which the reservation regions 11 are inserted into the code file 4.

The patch application unit 7 writes a relative short branch instruction for branching to a reservation region 11 into the patch target region 12 and writes a relative branch instruction for branching to the patch main body 13 utilizing the reservation region 11. Therefore, even when the word length of the patch target region 12 is shorter than the word length of the relative branch instruction, branching to the patch main body 13 is performed in a program to which a patch is applied.

For example, while branching to the patch main body 13 is performed using a reservation region 11, the reservation region 11 may be used for call of a particular routine. The reservation region 11 may be used for call, for example, of a thread scheduler.

In thread control, switching from a certain thread to a different thread is performed. The thread may be a unit for parallel execution of a program. The thread is faster in switching because the thread may require a small amount of context information as compared with a process.

A method of switching from a certain thread to a different thread may include two methods. One of the methods is that a thread itself waits until the thread itself waives the right to execute. With this method, since switching of the thread is performed only by operation within a user space, the switching cost is low (switching time period is short). However, unless the user waives the right to execute, the switching is not performed, and compulsive switching is not performed from the system side.

With the second method, the operating system (OS) takes control by interrupt by a timer or the like to switch a thread. Although this method allows switching from the system side, the switching cost is high (switching time period is long).

Figure 8:
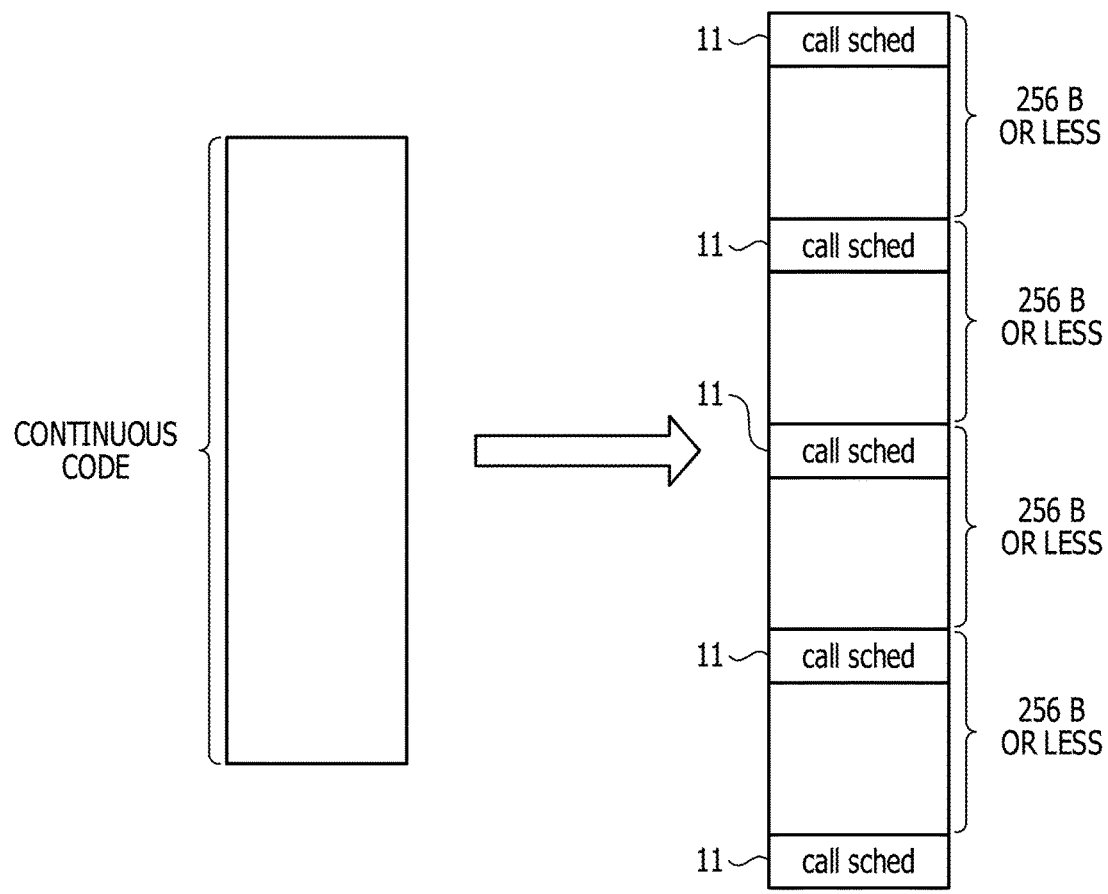
FIG. 8 illustrates an example of insertion of a branch instruction into a thread scheduler by a compile unit.
Figure 9:
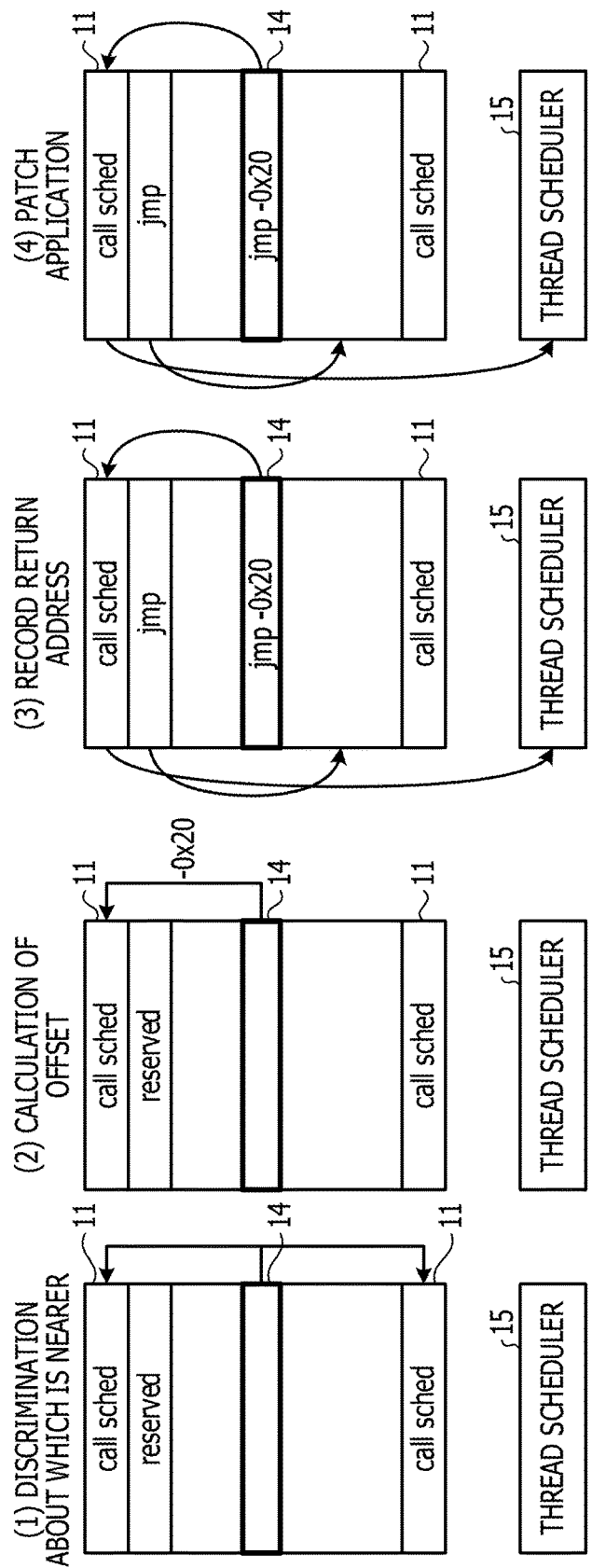
FIG. 9 illustrates an example of patch application for transferring control to a thread scheduler.

The information processing apparatus 1 executes high-speed thread switching by calling a thread scheduler utilizing a reservation region 11. FIG. 8 illustrates an example of insertion of a branch instruction into a thread scheduler by a compile unit. The compile unit described with reference to FIG. 8 may be the compile unit 3 illustrated in FIG. 4. FIG. 9 illustrates an example of patch application for transferring control to a thread scheduler.

As depicted in FIG. 8, the compile unit 3 divides a continuous code into codes of equal to or less than 256 B each including a reservation region 11 and writes a relative branch instruction to a thread scheduler into the reservation region 11. In FIG. 8, call sched represents a relative branch instruction to a thread scheduler.

During execution of the code with regard to which the relative branch instruction to the thread scheduler is written in the reservation region 11, the patch application unit 7 looks into a stack to specify a module that is operating at present. The patch application unit 7 decides, as depicted in FIG. 9, to the top address of which one of preceding and succeeding reservation regions 11 a relative short branch instruction 14 in the module is nearer (1).

The patch application unit 7 calculates an offset between the top address of the nearer reservation region 11 and the top address of the relative short branch instruction 14 (2). In FIG. 9, it is decided that the reservation region 11 preceding to the relative short branch instruction 14 is nearer to the relative short branch instruction 14, and −0x20 is the calculated offset.

The patch application unit 7 writes a jump instruction to an address to which jumping is to be performed originally by the relative short branch instruction 14 next to call sched written in the nearer reservation region 11. For example, the patch application unit 7 writes a jump instruction to a return address when the control is to return from a thread scheduler 15 (3). Then, the thread scheduler 15 operates on a CPU different from the program by which the patch application unit 7 performs a patch.

The patch application unit 7 writes the calculated offset into the second byte of the relative short branch instruction 14 (4). In this manner, the patch application unit 7 calls the thread scheduler 15 utilizing call sched written in the reservation region 11, and the patch target program 12 transfers the control at a high speed to the different thread.

The thread scheduler 15 may be called, and this is applied similarly also where a different routine is called.

The functions of the compile unit 3 and the patch application unit 7 may be implemented by software, and a complier and a patch program including similar functions may be obtained.

Figure 10:
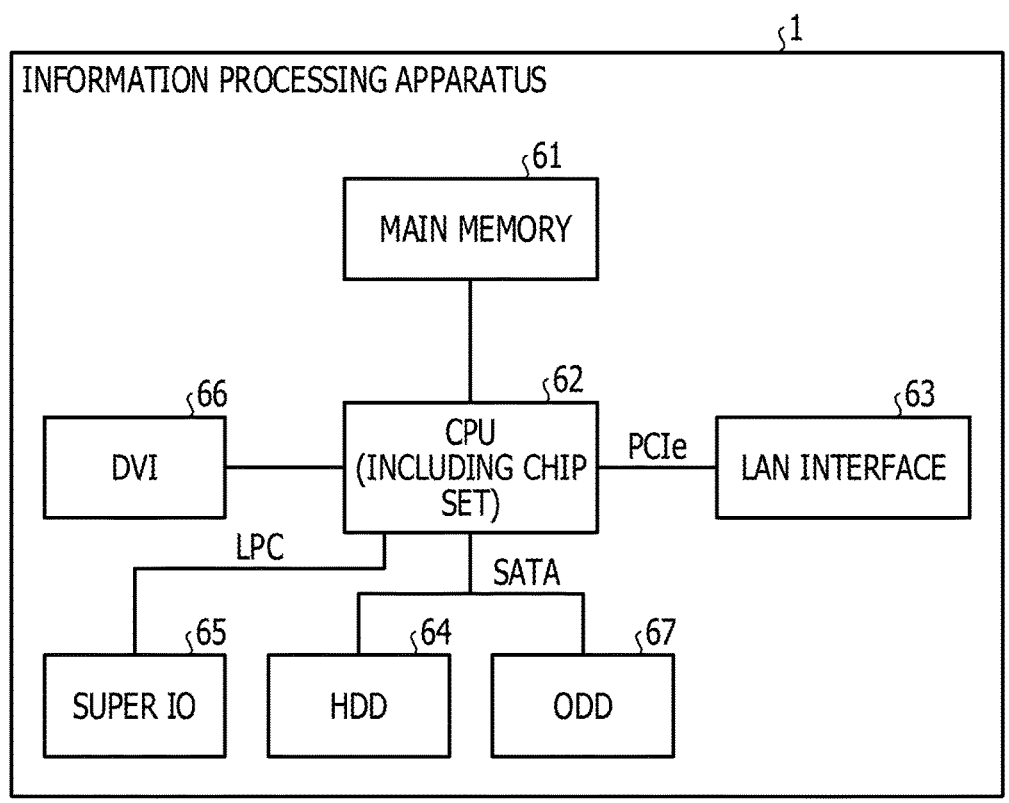
FIG. 10 depicts an example of a hardware configuration of an information processing apparatus that executes a compiler and a patch program.

FIG. 10 depicts an example of a hardware configuration of an information processing apparatus that executes a compiler and a patch program. The information processing apparatus illustrated in FIG. 10 may be the information processing apparatus 1 illustrated in FIG. 4. As depicted in FIG. 10, the information processing apparatus 1 includes a main memory 61, a CPU 62, a local area network (LAN) interface 63, and a hard disk drive (HDD) 64. The information processing apparatus 1 further includes a super input output (IO) 65, a digital visual interface (DVI) 66, and an optical disk drive (ODD) 67.

The main memory 61 is a memory for storing a program, an execution intermediate result of the program and so forth. The patch application unit 7 applies a patch to a code stored in the main memory 61. The CPU 62 is a central processing unit that reads out a program from the main memory 61 and executes the program. The CPU 62 includes a chip set including a memory controller.

The LAN interface 63 is an interface for coupling the information processing apparatus 1 to a different information processing apparatus through a LAN. The HDD 64 is a disk apparatus for storing a program and data. The source file 2 and the code file 4 are stored into the HDD 64.

The super IO 65 is an interface for coupling an inputting apparatus such as a mouse or a keyboard. The DVI 66 is an interface for coupling a liquid crystal display apparatus. The ODD 67 is an apparatus for performing reading and writing a digital versatile disk (DVD).

The LAN interface 63 is coupled to the CPU 62 by a peripheral component interconnect express (PCIe), and the HDD 64 and the ODD 67 are coupled to the CPU 62 by a serial advanced technology attachment (SATA). The super IO 65 is coupled to the CPU 62 by a low pin count (LPC).

For example, a compiler and a patch program to be executed by the information processing apparatus 1 are stored in a DVD, read out from the DVD by the ODD 67 and installed into the information processing apparatus 1. For example, the compiler and the patch program are stored into a database or the like of a different information processing apparatus coupled through the LAN interface 63, read out from the database and installed into the information processing apparatus 1. For example, the installed compiler and the patch program are stored into the HDD 64, read out into the main memory 61 and executed by the CPU 62.

The compile unit 3 and the patch application unit 7 may operate in the same information processing apparatus 1, and the compile unit 3 and the patch application unit 7 may operate in different information processing apparatuses from each other. The disclosed technology may be applied similarly also where, for example, the compile unit generates a code to be executed by a different information processing apparatus by cross-compile.

A code may be executed by a CPU, or may be executed by an arithmetic processing unit such as a micro processing unit (MPU).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a memory configured to store a first code; and
a processor configured to compile a source file to generate the first code, wherein the first code is an intermediate code generated based on a result of analysis of a source program from the source file, the processor:
generates a second code, which is executable by the processor, from the intermediate code;
divides the second code into blocks each which has a size equal to or smaller than a given size and includes a reservation region provided at a specific position and at least a part of the second code so as to generate the first code, wherein the given size is a size within a short branch instruction in the block reach one of preceding and succeeding reservation regions;
selects one reservation region from a first reservation region and a second reservation region which is nearer a target region in one of the blocks, the first reservation region being included in the one of the blocks and the second reservation region being included in another one of the blocks;
writes, in the target region, a first branch instruction to branch a selected reservation region;
writes, in the selected reservation region, a second branch instruction to branch another region in a different one the blocks; and
store the modified second code in a storage in order to be executed by the processor.

2. The information processing apparatus according to claim 1, wherein the processor inserts a call instruction of a specific program into the reservation region.

3. The information processing apparatus according to claim 2, wherein the processor inserts a third branch instruction to branch to an instruction next to the target region as a next instruction to the call instruction into the reservation region.

4. The information processing apparatus according to claim 2, wherein the specific program is a thread scheduler.

5. The information processing apparatus according to claim 1, wherein the first branch instruction is a short branch instruction and the second branch instruction is a relative branch instruction.

6. A compile method comprising:
generating, by a computer, a second code from a first code that is executable by an arithmetic processing unit, wherein the first code is an intermediate code generated based on a result of analysis of a source program;
dividing, by the computer, the generated code into blocks each which has a size equal to or smaller than a given size and includes a reservation region provided at a specific position and at least a part of the second code so as to generate a first code, wherein the given size is a size within a short branch instruction in the block reach one of preceding and succeeding reservation regions;
selecting one reservation region from a first reservation region and a second reservation region which is nearer a target region in one of the blocks, the first reservation region being included in the one of the blocks and the second reservation region being included in another one of the blocks;
writing, in the target region, a first branch instruction to branch a selected reservation region;
writing, in the selected reservation region, a second branch instruction to branch another region in a different one the blocks; and
storing the modified second code in a storage in order to be executed by the arithmetic processing unit.

7. The compile method according to claim 6, further comprising:
inserting a call instruction of a specific program into the reservation region.

8. The compile method according to claim 7, wherein further comprising:
inserting a third branch instruction to branch to an instruction next to the target region as a next instruction to the call instruction into the reservation region.

9. The compile method according to claim 7, wherein the specific program is a thread scheduler.

10. The compile method according to claim 6, wherein the first branch instruction is a short branch instruction and the second branch instruction is a relative branch instruction.

11. A non-transitory recording medium storing a compile program to be executed by a computer, the computer, based on the compile program, performs of:
generating a second code from a first code which is executable by an arithmetic processing apparatus wherein the first code is an intermediate code generated based on a result of analysis of a source program;

dividing the second code into blocks each which has a size equal to or smaller than a given size and includes a reservation region provided at a specific position and at least a part of the second code so as to generate a first code, wherein the given size is a size within a short branch instruction in the block reach one of preceding and succeeding reservation regions;

selecting one reservation region from a first reservation region and a second reservation region which is nearer a target region in one of the blocks, the first reservation region being included in the one of the blocks and the second reservation region being included in another one of the blocks;

writing, in the target region, a first branch instruction to branch a selected reservation region;

writing, in the selected reservation region, a second branch instruction to branch another region in a different one the blocks; and storing the modified second code in a storage in order to be executed by the arithmetic processing apparatus.

12. The non-transitory recording medium according to claim 11, further comprising:
    inserting a call instruction of a specific program into the reservation region.

13. The non-transitory recording medium according to claim 12, further comprising:
    inserting a third branch instruction to branch to an instruction next to the target region as a next instruction to the call instruction into the reservation region.

14. The non-transitory recording medium according to claim 12, wherein the specific program is a thread scheduler.

15. The non-transitory recording medium according to claim 11, wherein the first branch instruction is a short branch instruction and the second branch instruction is a relative branch instruction.

* * * * *